UNITED STATES PATENT OFFICE.

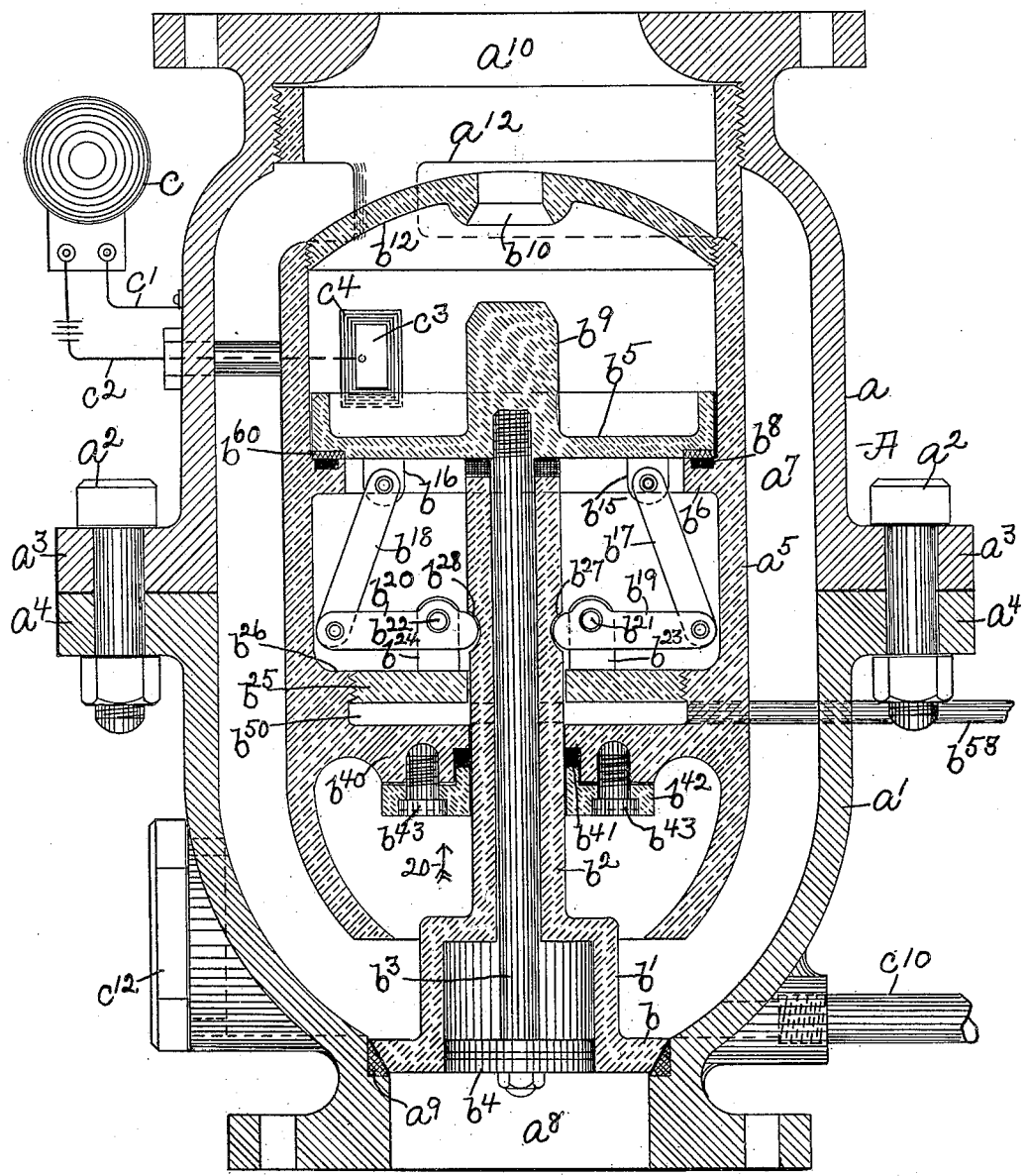

JOHN H. DERBY, OF BOSTON, MASSACHUSETTS, ASSIGNOR, BY DIRECT AND MESNE ASSIGNMENTS, TO EVERETT D. CHADWICK, TRUSTEE, OF SAME PLACE.

AUTOMATIC VALVE.

SPECIFICATION forming part of Letters Patent No. 647,810, dated April 17, 1900.

Application filed December 10, 1897. Serial No. 661,333. (No model.)

*To all whom it may concern:*

Be it known that I, JOHN H. DERBY, of Boston, county of Suffolk, and State of Massachusetts, have invented an Improvement in Automatic Valves, of which the following description, in connection with the accompanying drawing, is a specification, like letters on the drawing representing like parts.

My invention relates to automatic valves, and more particularly to that species thereof known as "dry" valves, such as are used in connection with automatic sprinkler systems for extinguishing fires.

A dry valve embodying a preferred form of my invention is illustrated in the accompanying drawing, in which the figure shows a central vertical section of the valve.

The casing A of my valve is preferably cylindrical in form and may be made in two parts $a\ a'$, firmly secured together liquid-tight by bolts $a^2$, extending through flanges $a^3\ a^4$ formed on said parts. The casing A contains within it, as shown, a smaller cylindrical casing $a^5$, open at both ends and rigidly secured to the casing A by means of the screw-threads shown at its upper end or otherwise. A space $a^7$ is thus provided between the two casings, which, in connection with ports $a^{12}$, formed in the walls of the inner casing near its upper end, affords a free passage for the water from the inlet $a^8$ at the lower end of the casing A to the outlet $a^{10}$ at its upper end. The casing A is provided near its lower end with a valve-seat $a^9$, against which a valve proper, $b$, is adapted to be seated to close the inlet $a^8$. My present invention relates chiefly to this valve $b$ and to the combination therewith of a certain locking mechanism to be presently described, and I do not claim herein my valve-casing or my locking mechanism broadly, they being claimed in Letters Patent No. 625,748, granted May 30, 1899, for improvements in automatic valves invented by me. My valve proper, $b$, is made of two parts, both of which are normally exposed to the pressure of the inlet $a^8$ and which are so arranged and connected that one of said parts is normally locked against being opened by mechanism adapted to be actuated by the other end of said parts upon the occurrence of the conditions which determine the opening of the valve. According to the arrangement of these parts, which is shown in the drawing, the part $b'$ of the valve resembles a short cylinder provided at its upper end with a hollow extension or stem $b^2$ and having its lower end formed to accurately fit the valve-seat $a^9$. The other part $b^4$ of the valve proper consists of a piston adapted to slide in the cylinder $b'$ and provided with a piston-rod $b^3$, passing upward through the hollow stem $b^2$ to the valve-locking mechanism which it actuates.

The locking mechanism for the part $b'$ of the valve proper consists, preferably, of two levers $b^{19}\ b^{20}$, pivoted, as at $b^{21}\ b^{22}$, to lugs $b^{23}\ b^{24}$, attached to a cross-plate $b^{25}$, secured to the casing $a^5$, preferably by means of screw-threads adapted to engage a threaded flange $b^{26}$, formed on said casing $a^5$. The inner ends of the levers $b^{19}\ b^{20}$ are adapted to engage recesses $b^{27}\ b^{28}$ in the stem $b^2$, and the outer ends of said levers are pivoted to links $b^{17}\ b^{18}$, which are also pivoted to lugs $b^{15}\ b^{16}$, depending from a movable plate $b^5$. The plate $b^5$ is rigidly secured to the upper end of the piston-rod $b^3$ and is normally held at the limit of its downward movement by means of the pressure of the compressed air in the pipe system of which the valve-casing forms a part, said pressure being given access to the top of the plate $b^5$ through a port $b^{10}$ in a detachable head $b^{12}$, with which the casing $a^5$ is provided near its upper end. The space immediately below the plate $b^5$ is closed at its bottom against the entrance of the compressed air by a partition $b^{40}$, provided with a packing through which the valve-stem $b^2$ slides and which may consist of a washer of suitable packing material $b^{41}$, held in place by a plate $b^{42}$, which is attached to the partition $b^{40}$ by screws $b^{43}$. The closed chamber thus formed between the partition $b^{40}$ and the movable plate $b^5$ is put in communication with the external atmosphere by means of a pipe $b^{53}$, and thereby the full effect of the compressed-air pressure in the system is made operative on the movable plate $b^5$ to hold it down against the pressure of the water in the inlet $a^8$ against the piston $b^4$.

The movable plate $b^5$ preferably forms a piston sliding easily in the casing $a^5$ and adapted to seat against an annular flange $b^6$ on the casing $a^5$, which flange may be provided with a packing-ring $b^8$, so that the chamber below the plate $b^5$ may be tightly closed thereby. Thus when the parts of the valve are in their normal position, which is that illustrated in the drawing, the compressed air in the system will operate on the plate $b^5$ to hold it against its seat, and thereby maintain the levers $b^{19}$ $b^{20}$ in position to lock the part $b'$ of the valve closed, and it will be readily seen that the advantage gained by my two-part construction of the valve proper is that a considerable portion of the valve against which the water-pressure acts is positively locked against its seat, so that the water-pressure which must be overcome by the compressed-air pressure acts only on a small portion of the area of the valve and may therefore be balanced by a much-reduced air-pressure acting on the greater area of the movable plate $b^5$, which actuates the valve-locking mechanism. Thus by sufficiently reducing the size of the piston $b^4$ the necessary compressed-air pressure may be correspondingly reduced to any desired extent, a result which is well known to be very desirable. It will be noticed that the pressure of the water against the portion $b'$ of the valve proper, acting through the locking-levers and their connecting-links, tends to hold the plate $b^5$ all the more firmly to its seat and provides a small additional resistance which must be overcome by the pressure of the water on the piston $b^4$ before the valve can open.

In operation, when the air-pressure on the plate $b^5$ has been reduced to a predetermined point, as by the opening of a sprinkler, the water-pressure acting on the piston $b^4$ will move the plate $b^5$ upward, and thereby disengage the locking-levers from the recesses in the valve-stem $b^2$, whereupon the water will force open the portion $b'$ of the valve and flow through the space between the two casings into the sprinkler system. At the same time the rising of the plate $b^5$ will cause a projection $b^9$, formed thereon, to enter and close the port $b^{10}$, thereby preventing the water from entering the space above the plate $b^5$ and exerting pressure thereon. In case any water leaks by the valve $b^9$ and plate $b^5$ it will be drained from the casing through the pipe $b^{53}$. When it is desired to set the valve again, the water-supply is cut off and the water is drained from the sprinkler system through a suitable pipe $c^{10}$, after which the portion $b'$ of the valve is moved downward against its seat by hand, if necessary, access thereto being had through a suitable hand-hole provided with a removable cover $c^{12}$. Compressed air is then forced into the sprinkler system and the plate $b^5$ is thereby moved downward to its seat, locking the valve closed.

In order that a slight movement of the plate $b^5$ may suffice to unlock the valve, I prefer to offset the pivots $b^{21}$ $b^{22}$ on which the levers $b^{19}$ $b^{20}$ rock from the longitudinal axis of said levers, it being obvious that the greater the amount of this offsetting the less the angular movement necessary to be given to the locking-levers in order to withdraw them from engagement with the stem $b^2$.

The pipe $c^{10}$ will serve as a leakage-drain and should be connected to an automatic alarm-trap. (Not herein shown.)

It is sometimes desirable to cause the opening of the valve to give an alarm, and for this purpose an electric bell $c$ may be provided and included in a battery-circuit having one of its terminals $c'$ directly connected to the outside casing A and its other terminal $c^2$ connected with a contact-plate $c^3$, secured to an insulating-support $c^4$, which is set into the inner casing just above the movable plate $b^5$, so that said plate will close the circuit through the bell $c$ after moving but a short distance.

I claim as my invention—

1. In an automatic valve, a two-part valve proper, both parts thereof being exposed to the pressure in the valve-inlet, means for holding one of said parts positively locked against its seat, and mechanism operated by the other of said parts for unlocking said valve.

2. In an automatic valve, a two-part valve proper, one of said parts being hollow and the other of said parts sliding therein, a movable plate rigidly connected to said sliding part, and valve-locking mechanism arranged to be operated by said movable plate.

3. In an automatic valve normally containing air under pressure, a two-part valve proper, a movable plate on which said air-pressure is operative, and valve-locking mechanism arranged to be operated by said plate, the latter being also directly connected to one of the parts of the valve proper.

4. In an automatic valve normally containing air under pressure, a two-part valve proper comprising a hollow portion having a piston arranged to slide therein, a movable plate rigidly attached to said piston and on which the air-pressure is operative, pivoted levers arranged to lock the hollow portion of the valve to its seat, and links connecting said levers with the movable plate.

5. In an automatic valve normally containing air under pressure, the combination of an outer casing provided with a two-part valve proper, an inner casing suspended therein, a normally-closed chamber in said inner casing in communication with the external air, and a movable plate arranged to close said chamber, said plate being directly connected to one of the parts of the valve proper, and also to mechanism whereby the other part of the valve proper is normally locked to its seat.

6. In an automatic valve normally containing air under pressure, the combination of an outer casing provided with a two-part valve proper, an inner casing suspended therein and provided with a port in its top wall, a movable plate in said inner casing provided with a projection adapted to coöperate with said port, a chamber in said inner casing normally closed by said movable plate, and a two-part valve proper one part of which is directly connected to the movable plate, the other part thereof being normally locked to its seat by mechanism arranged to be operated by said movable plate.

In testimony whereof I have signed my name to this specification in the presence of two subscribing witnesses.

JOHN H. DERBY.

Witnesses:
 JAS. H. CHURCHILL,
 J. MURPHY.